United States Patent [19]

Ueda et al.

[11] Patent Number: 5,057,759
[45] Date of Patent: Oct. 15, 1991

[54] DISCRETE-TIME AC MOTOR CONTROL APPARATUS

[75] Inventors: Yoshihiro Ueda; Takaaki Yamada, both of Tsukuba, Japan

[73] Assignee: Omron Corporation, Kyoto, Japan

[21] Appl. No.: 544,427

[22] Filed: Jun. 27, 1990

[30] Foreign Application Priority Data

Jul. 14, 1989 [JP] Japan .................................. 1-180407

[51] Int. Cl.⁵ ............................ G05B 5/01; H02P 5/40
[52] U.S. Cl. ...................................... 318/616; 318/615; 318/561; 318/800; 318/803
[58] Field of Search ................................ 318/560-646, 318/779-830

[56] References Cited

U.S. PATENT DOCUMENTS

| | | | |
|---|---|---|---|
| 4,388,577 | 6/1983 | Blaschke et al. | 318/803 X |
| 4,475,074 | 10/1984 | Reng | 318/800 |
| 4,680,518 | 7/1987 | Kurakake et al. | 318/561 |
| 4,695,780 | 9/1987 | Kurakake et al. | 318/561 |
| 4,777,422 | 10/1988 | Slicker et al. | 318/800 |
| 4,792,870 | 12/1988 | Pinson | 318/561 X |
| 4,816,734 | 3/1989 | Kurakake et al. | 318/615 |
| 4,825,773 | 5/1989 | Morishita et al. | 318/187 X |
| 4,851,754 | 7/1989 | Sakamoto et al. | 318/616 |
| 4,943,759 | 7/1990 | Sakamoto et al. | 318/565 X |
| 4,958,114 | 9/1990 | Ogawa | 318/616 |

OTHER PUBLICATIONS

Lawrence A. Jones, Jeffery H. Lang "A State Observer for the Permanent-Magnet Synchronous Motor" IECON 1987 Conference, Cambridge, MA, Nov. 2-6, 1987.

Yoshihiro Ueda, Takaaki Yamada "A State Observer for the Permanent Magnet Synchronous Motor with Inductance Variations and its Characteristics" Proceedings of the 33rd Ann. Conf. of the Inst. of Systems, ISCIE, 1989.

Primary Examiner—Paul Ip
Attorney, Agent, or Firm—Dickstein, Shapiro & Morin

[57] ABSTRACT

In a discrete-time alternating-current motor control apparatus having a state estimation observer estimating a rotor angle and a rotor angular velocity based on a direct quadrature transformation model of the motor, the gain of the observer is changed over depending on an estimated angular velocity. As a result, the apparatus is applicable in a wide range of the motor speed.

Furthermore, the phase difference between the winding voltages and the winding currents supplied to the state estimation observer is compensated depending on the estimated angular velocity, thereby improving the control accuracy.

4 Claims, 8 Drawing Sheets

DISCRETE-TIME AC MOTOR CONTROL APPARATUS

| $\hat{\omega}$ | $g_{11}$ | $g_{12}$ | $g_{21}$ | $g_{22}$ | $g'_{11}$ | $g'_{12}$ |
|---|---|---|---|---|---|---|
| $\hat{\omega}_1 \sim \hat{\omega}_2$ | $g_{111}$ | $g_{121}$ | $g_{211}$ | $g_{221}$ | $g'_{111}$ | $g'_{121}$ |
| $\hat{\omega}_2 \sim \hat{\omega}_3$ | $g_{112}$ | $g_{122}$ | $g_{212}$ | $g_{222}$ | $g'_{112}$ | $g'_{122}$ |
| ⋮ | ⋮ | ⋮ | ⋮ | ⋮ | ⋮ | ⋮ |
| $\hat{\omega}_n \sim \hat{\omega}_{n+1}$ | $g_{11n}$ | $g_{12n}$ | $g_{21n}$ | $g_{22n}$ | $g'_{11n}$ | $g'_{12n}$ |

| $\widehat{\omega}_k$ | $\triangle\theta_k$ |
|---|---|
| $\widehat{\omega}_1$ | $\triangle\widehat{\theta}_1$ |
| $\widehat{\omega}_2$ | $\triangle\widehat{\theta}_2$ |
| ⋮ | ⋮ |
| $\widehat{\omega}_n$ | $\triangle\widehat{\theta}_n$ |

DISCRETE-TIME AC MOTOR CONTROL APPARATUS

BACKGROUND OF THE INVENTION

1. Field of the Invention

The present invention relates to a control apparatus of an alternating-current (AC) motor operating in a discrete-time fashion.

2. Description of the Related Art

When achieving a positioning control in a control apparatus of a permanent-magnet (PM) alternating-current motor, an angle of a rotor of the motor is required to be sensed for a feedback of information of the rotor angle. For this purpose, the conventional technology has employed a sensor such as an encoder or a resolver. Furthermore, in the alternating-current motor, it is necessary to change a phase of a current flowing through each winding of the motor depending on the rotation angle of the rotor. In order to sense the magnetic pole positions of the rotor, the conventional system employs a sensor such as a pole sensor.

However, these sensors above cannot be used in general at a high temperature and is moreover not satisfactorily resistive against vibration and shock. In consequence, the conventional motor control apparatus using such sensors has been attended with a problem that the desired control operation cannot be achieved in such an environment.

On the other hand, a state estimation observer has been proposed by Lawrence A. Jones et al. in "A STATE OBSERVER FOR THE PERMANENT-MAGNET SYNCHRONOUS MOTOR", IECON 1987 Conference, Cambridge, Mass., Nov. 2-6, 1987. In this observer, a direct quadrature (dq) transformation model of a permanent-magnet alternating-current motor and a linear observer theory are applied to estimate a rotor angle and an angular velocity thereof from winding current and voltage values of the alternating-current motor. Furthermore, advantages associated with the direct quadrature transformation model has been described in the article.

However, in an actual case where a control apparatus is configured with a state estimation observer to control an alternating-current motor, if the state estimation observer has a fixed gain, there have been problems that an estimation value produced by the observer becomes unstable when a speed of the motor is changed in a wide range and that the response time to obtain the observer estimation value becomes to be longer. Namely, the alternating-current motor cannot be controlled in a stable state at a high speed. For example, in a case where the observer gain of such a motor control system is set to a value suitable for a speed substantially equal to 1,500 rotations per minutes (rpm), if the control apparatus attempts to control an alternating-current motor rotating at 500 rpm, the state estimation observer cannot obtain a converged estimation value.

Furthermore, the rotation angle estimated by the state estimation observer is an electric angle, which leads to a problem that assuming the number of rotor poles to be N ($\geq 2$), a unique mechanical angle cannot be determined.

In addition, the state estimation observer receives as inputs thereto winding voltages and currents of the alternating-current motor, which results in a problem that when a phase difference is found in association with the currents and the voltages, a rotation angle and an angular velocity thus estimated include estimation errors.

SUMMARY OF THE INVENTION

It is therefore an object of the present invention to provide a discrete-time alternating-current motor control apparatus capable of controlling the motor in a wide range of the motor speed.

Another object of the present invention is to provide a control apparatus of a permanent-magnet alternating-current motor, said control apparatus unnecessitating sensors to measure information items of the angle, the angular velocity, and the magnetic pole.

Still another object of the present invention is to carry out an estimation with a high precision or accuracy even when phase differences exist in association with the inputs of the winding voltages and winding currents.

In accordance with the present invention, there is provided a discrete-time alternating-current motor control apparatus including a state estimation observer which receives as inputs thereto voltages and currents of windings of the alternating-current motor to estimate a rotor speed and an angular velocity of the alternating-current motor based on a model of the motor. The observer is characterized by further comprising observer gain switch means for setting an optimal gain in the state estimation observer according to the estimated angular velocity.

In accordance with the present invention, since the estimation state observer means is assigned with an optimal gain in association with a rotation angular velocity of the motor by means of the observer gain switch means, a predetermined control performance can be continuously accomplished in a broad velocity range.

Preferably, the observer gain switch means employs a hysteresis with respect to the estimated angular velocity for a gain switch. As a result, the unstable operation is prevented from being developed in the gain switch operation.

The alternating-current (AC) control apparatus in accordance with the present invention further comprises origin angle sense means for sensing an origin position of a rotor of the AC motor and a controller for controlling the motor based on the estimation result attained from the state estimation observer means and the origin position sensed by the origin angle sense means.

With the provision of the above constitution, when controlling a permanent-magnet alternating-current motor, there are unnecessitated an angle sensor such as and encoder or a resolver, an angular velocity sensor such as a tachometer generator or a frequency-to-voltage (F/V) converter, and a rotor pole sensing device such as a pole sensor. Furthermore, signal lines to feed back signals from the various sensors to the respective signal processing components associated therewith Can be dispensed with. Since these sensors are removed, the motor above can be employed under various environmental conditions such as the high temperature, the vibration, the shock in a wider variations as compared with the conventional case. Owing to the elimination of the signal lines for the sensors, there can be attained advantages that the resistivity against noises and the operation reliability are improved in the control apparatus and that the cost thereof is lowered. In accordance with the present invention, there is implemented a control apparatus of a permanent-magnet alternating-current motor, said control apparatus unnecessitating the sensors of the angle, the angular velocity, and the magnetic pole positions.

Moreover, in accordance with the present invention, there is provided a discrete-time alternating-current motor control apparatus including a state estimation observer which receives as inputs thereto winding voltages applied to the motor and currents of the motor windings measured by current sensors to estimate a rotor speed and an angular velocity of the alternating-current motor based on a model of the motor. The system is characterized by further comprising means for compensating phase differences associated with the voltages and currents of the windings depending on the estimated angular velocity.

In the constitution according to the present invention, the state estimation observer means can estimate with a higher precision the values of the rotor speed, the angular velocity, and the winding currents of the alternating-current motor.

BRIEF DESCRIPTION OF THE DRAWINGS

These and other objects and advantages of the present invention will become apparent by reference to the following description and accompanying drawings wherein:

FIGS. 1 to 3 are diagrams for explaining an embodiment according to the present invention;

FIGS. 4 to 6 are diagrams for explaining an alternative embodiment according to the present invention;

DESCRIPTION OF THE PREFERRED EMBODIMENTS

Figure 1:
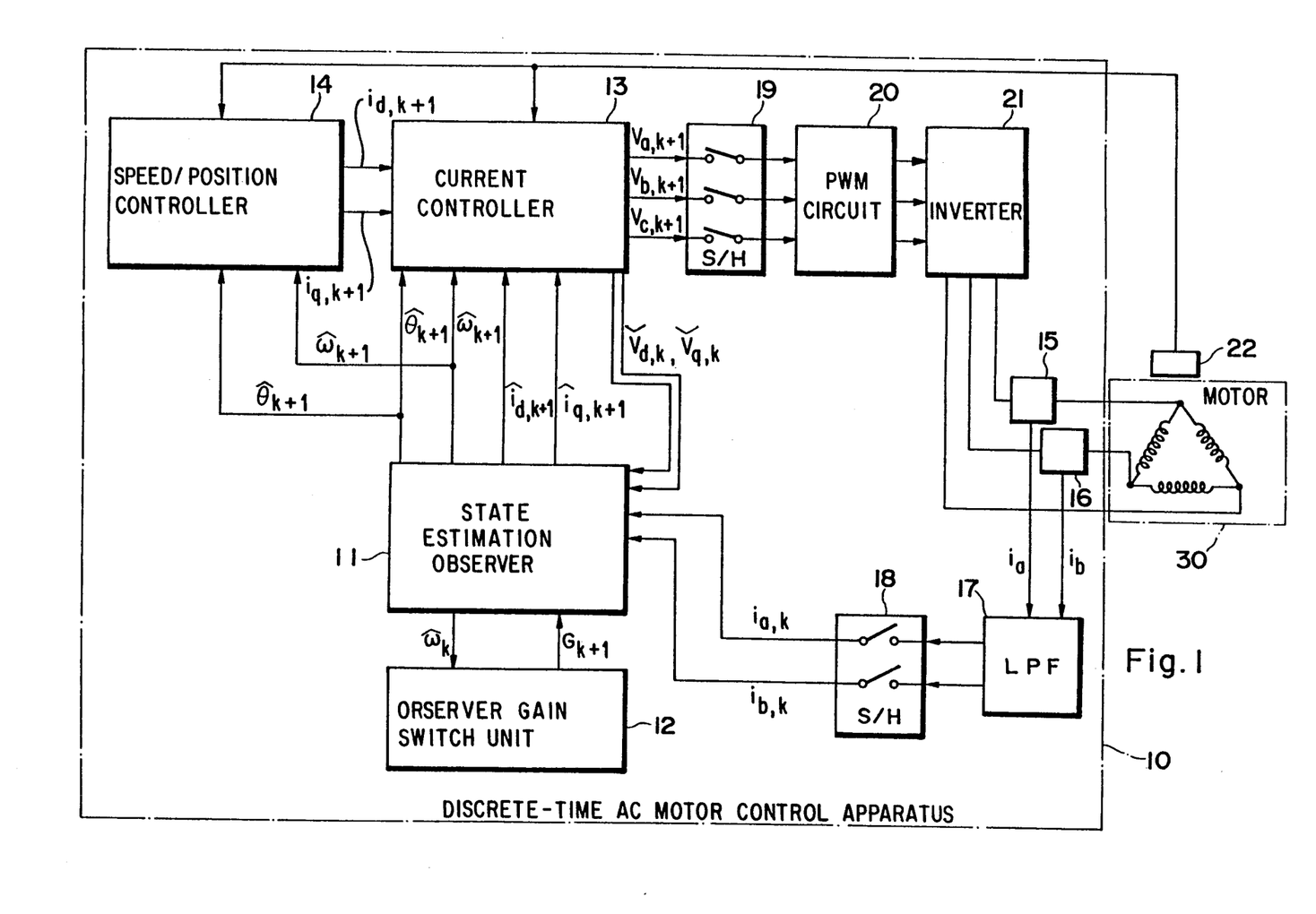
FIG. 1 is a functional block diagram showing a conceptual structure of a discrete-time alternating-current motor control apparatus.

FIG. 1 shows an embodiment of the alternating-current motor control apparatus of the discrete-time type in accordance with the present invention.

The configuration includes a permanent-magnet alternating-current motor 30 as a control object, which is a three-phase motor associated with phases a, b, and c. Currents and voltages of the respective phases are represented as $i_a$, $i_b$, and $i_c$ and $v_a$, $v_b$ and $v_c$, respectively.

A discrete-time AC motor control apparatus 10 includes a state estimation observer 11, an observer gain switch unit 12, a current controller 13, a speed/position controller 14, current sensors 15 and 16, a low-pass filter 17, sample-and-hold circuit 18 and 19, a pulse width modulation (PWM) circuit 20, an inverter 21, and an origin sense switch 22. Some components above, for example, the observer 11, the gain switch unit 12, and the controllers 13 and 14 are implemented by use of a computer loaded with an appropriate program.

Of the parameters (physical quantities) used in the motor control apparatus 10, measured values are indicated by codes marked with ˇ thereover, estimated values are designated by codes with ˆ thereover, and vectors are denoted by underlined codes.

As will be shown later, parameters (for example, currents $i_a$ and $i_b$) of the motor 30 are transformed in accordance with an orthogonal coordinate system of a two-phase stator. Transformed parameters are represented by use of subscripts $\alpha$ and $\beta$ as $i_\alpha$ and $i_\beta$, for example. Furthermore, for an estimation processing, the parameters are subjected to a direct quadrature (dq) transformation based on an estimated rotator angle $\hat{\theta}$ (a transformation into a biaxial orthogonal coordinate system rotating in synchronism with the rotor). The parameters after the direct quadrature transformation are expressed, for example, as $i_d$ and $i_q$ with subscripts d and q.

First, a brief description will be given of an alternating-current motor model adopted in the state estimation observer. As described in the article above, based on a voltage $\check{v}$ applied to a winding and a sensed winding current $\check{i}$, the observer estimates a winding current $\hat{i}$, a rotor angular velocity $\hat{\omega}$, and a rotor angle $\hat{\theta}$ from expressions (1) to (3) as follows.

$$d\hat{\underline{i}}/dt = -\{(R/L)I + JN\hat{\omega}\}\hat{\underline{i}} - (K/L)N\hat{\omega}\begin{bmatrix}0\\1\end{bmatrix} + (1/L)\check{\underline{v}} + G_{2\times 2}(\check{\underline{i}} - \hat{\underline{i}}) \quad (1)$$

$$d\hat{\omega}/dt = -(B/H)\hat{\omega} + \hat{\underline{i}}^T(KN/H)\begin{bmatrix}0\\1\end{bmatrix} - (C/H)(\hat{\omega}/|\hat{\omega}|) - (1/H)\tau + G_{1\times 2}(\check{\underline{i}} - \hat{\underline{i}}) \quad (2)$$

$$d\hat{\theta}/dt = \hat{\omega} \quad (3)$$

Where:
L: Winding inductance, R: Winding resistance,
K: Torque constant, B: Viscosity friction
C: Coulomb friction, H: Inertia,
$\tau$: Torque, N: Number of pole pairs $$J = \begin{bmatrix}0 & -1\\1 & 0\end{bmatrix}$$

$$\check{\underline{v}} = (\check{v}_d, \check{v}_q)^T = \exp(-JN\hat{\theta})\underline{v}$$

$$\hat{\underline{i}} = (\hat{i}_d, \hat{i}_q)^T$$

$$\check{\underline{i}} = (\check{i}_d, \check{i}_q)^T = \exp(-JN\hat{\theta})\underline{i}$$

$$\underline{i} = (i_\alpha, i_\beta)^T$$

$$\underline{v} = (v_\alpha, v_\beta)^T$$

$$G_{2\times 2} = \begin{bmatrix}g_{11} & g_{12}\\g_{21} & g_{22}\end{bmatrix}$$

$$G_{1\times 2} = [g_{11}' \ g_{12}']$$

The coulomb friction, the viscosity friction, and the inertia vary depending on the magnitude of load imposed on the motor. In addition, the inertia expressed above is associated with the mechanical system including the motor and the load.

In the expressions above, $i = (i_\alpha, i_\beta)^T$ is obtained by transforming a sensed winding current ($i_1$, $i_b$) in accordance with a coordinate system of a two-phase stator. Assuming the transformation to be $T(\theta)$, the result can be expressed as follows.

$$i = (i_\alpha, i_\beta)^T = T(\hat{\theta})(i_a, i_b)^T$$

The description above also applies to the expression $\underline{v} = (v_\alpha, v_\beta)^T$.

In a discretized form, the expressions (1) to (3) are respectively represented by expressions (4) to (7) as follows.

$$\hat{i}_{d,k+1} = \{-(R/L)\hat{i}_{d,k} + N\hat{\omega}_k\hat{i}_{q,k} + (1/L)\check{v}_{d,k} + g_{11}(\check{i}_{d,k} - \hat{i}_{d,k}) +$$
$$g_{12}(\check{i}_{q,k} - \hat{i}_{q,k})\}\Delta t + \hat{i}_{d,k} \quad (4)$$

$$\hat{i}_{q,k+1} = \{-(R/L)\hat{i}_{q,k} - N\hat{\omega}_k\hat{i}_{d,k} - (K/L)N\hat{\omega}_k + (1/L)\check{v}_{q,k} +$$
$$g_{21}(\check{i}_{d,k} - \hat{i}_{d,k}) + g_{22}(\check{i}_{q,k} - \hat{i}_{q,k})\}\Delta t + \hat{i}_{q,k} \quad (5)$$

$$\hat{\omega}_{k+1} = \{-(B/H)\hat{\omega}_k + (KN/H)\hat{i}_{q,k} - (C/H)(\hat{\omega}_k/|\hat{\omega}_k|) -$$
$$(1/H)\tau + g_{11}'(\check{i}_{d,k} - \hat{i}_{d,k}) + g_{12}'(\check{i}_{q,k} - \hat{i}_{q,k})\}\Delta t + \hat{\omega}_k \quad (6)$$

$$\hat{\theta}_{k+1} = \hat{\omega}_k \Delta t + \hat{\theta}_k \quad (7)$$

Where:

$$\begin{bmatrix} \check{i}_{d,k} \\ \check{i}_{q,k} \end{bmatrix} = \exp[-JN\hat{\theta}_k]T(\hat{\theta}_k)\begin{bmatrix} i_{a,k} \\ i_{b,k} \end{bmatrix}$$

$\Delta t$: Sampling time

The Subscript k denotes that the associated value is attained at a sampling time (point of time) k, whereas the subscript k+1 indicates that the value is obtained at a point of time when a sampling period of time $\Delta t$ is elapsed after the point of time k.

The motor winding currents $i_a$ and $i_b$ respectively attained from the current sensors 15 and 16 are sent via the low-pass filter 17, which removes noises from the received Signals, to the sample-and-hold circuit 18. The circuit 18 achieves a sample-and-hold operation at a sampling time k on these signals to be supplied respectively as $i_{a,k}$ and $i_{b,k}$ to the state estimation observer 11. The observer 11 then conducts a direct quadrature transformation on the received current values $i_{a,k}$ and $i_{b,k}$ based on the rotor angle $\hat{\theta}_k$ estimated at the time k−1 to generate current values $\check{i}_{d,k}$ and $\check{i}_{q,k}$. The state estimation observer 11 is also supplied with voltage values $\check{V}_{d,k}$ and $\check{v}_{q,k}$ obtained by the current controller 13 through the direct quadrature transformation conducted on the voltages applied to the windings, which will be described later. Based on the values $\hat{\omega}_k$, $\hat{i}_{d,k}$, $\hat{i}_{q,k}$ and $\hat{\theta}_k$ estimated at the time k−1 and the transformed values $\check{v}_{d,k}$, $\check{v}_{q,k}$, $\check{i}_{d,k}$ and $\check{i}_{1,k}$, the state estimation observer 11 estimates values $\hat{i}_{d,k+1}$, $\hat{i}_{1,k+1}$, $\hat{\omega}_{k+1}$, and $\hat{\theta}_{k+1}$ at the time k+1 from the expressions (4) to (7). In consequence, the rotor angle and the angular velocity can be obtained without using the angle and angular velocity sensors.

The estimated values $\hat{i}_{d,k+1}$ and $\hat{i}_{q,k+1}$ are fed to the current controller 13. Moreover, the estimated values $\hat{\omega}_{k+1}$ and $\hat{\theta}_{k+1}$ are delivered to the current controller 13 and the upper-level controller (speed/position controller) 14.

The current controller 13 can decide, based on the estimated value $\hat{\theta}_{k+1}$, phases to be assigned to the winding voltages to supply a current in association with magnetic pole positions of the rotor. In consequence, the magnetic pole sensor ca be dispensed with.

Moreover, the current controller 13 compares the current instruction values $i_{d,k+1}$ and $i_{q,k+1}$ fed from the upper-level controller 14 with the values $\hat{i}_{d,k+1}$ and $\hat{i}_{q,k+1}$ estimated by the state estimation observer 11 to compute based on a predetermined control algorithm the direct-quadrature transformation values $\check{v}_{d,k+1}$ and $\check{v}_{1,k+1}$ of the voltage applied to the motor windings, for example, to minimize the deviations associated therewith. In addition, the current controller 13 computes, in accordance with the value $\hat{\theta}_{k+1}$ described above voltages $v_{a,k+1}$, $v_{b,k+1}$ and $v_{c,k+1}$ to be applied to the motor windings. The resultant voltage values are passed via the sample-and-hold circuit 19 to the pulse-width modulation (PWM) circuit 20, which in turn transforms the received values into pulse widths. The obtained signals are delivered via the inverter (switch circuit) 21 to the motor windings.

In a case where the upper-level controller of the current controller 13 is the speed/position controller 14 as shown in FIG. 1, since the values $\hat{\omega}_{k+1}$ and $\hat{\omega}_{k+1}$ estimated by the state estimation observer 11 are fed to the speed/position controller 14, the angle and angular velocity sensors become to be unnecessary for the control of the speed and positions.

In this connection, since the rotor angle forecasted by the state estimation observer 11 is an electric angle, the obtained value $\hat{\theta}_{k+1}$ cannot be directly adopted to achieve the position control. However, a rotor angle necessary for the current control is an electric angle; furthermore, the convergence in the operation of the state estimation observer 11 can be accomplished at a high speed, which is satisfactory with respect to a time constant of the motor. In consequence, at an initiation of the motor operation, the motor can be started by use of the current controller and hence the origin angular position can be sensed by the origin sense switch 22. The origin sense signal is fed from the origin sense switch 22 to the current controller 13 and the speed/position controller 14. Based on the origin sense signal and the value $\hat{\theta}_{k+1}$ forecasted by the state estimation observer 11, the mechanical angle is computed. As described above, through the calibration above at the start point of the motor operation, the position control can be accomplished without using an angle sensor.

Subsequently, a description will be given of the observer gain switch unit 12. The state estimation observer 11 develops a nonlinear dynamics characteristic with respect to an angular velocity $\hat{\omega}_k$ as represented with the expressions (1) to (3) or (4) to (7). The dynamics characteristic alters depending on the observer gain values $G_{2\times 2}$ and $G_{1\times 2}$.

Consequently, in a general motor control apparatus in which the control speed range is not limited, in order to retain the control performance of the apparatus, the gain of the state estimation observer is required to be switched according to the speed. For the observer gain, an optimal value can be in advance computed by use of linearized error equation (expression (8) below) associated with the expressions (1) to (3).

$$\begin{bmatrix} \dot{\hat{e}}_d \\ \dot{\hat{e}}_q \\ \dot{\hat{e}}_\omega \\ \dot{\hat{e}}_\theta \end{bmatrix} = \begin{bmatrix} -(R/L) - g_{11}N\omega - g_{12} & i_q & g_{11}i_q - g_{12}'i_d + (1/L)v_q \\ -N\omega - g_{21} & -(R/L)g_{22} & -(K/L) - i_d g_{21}i_q - g_{22}i_d - (1/L)v_d \\ -g_{11}'(KN/H) & (1 - g_{12}')(KN/H) & -(B/H) & (KN/H)(g_{11}'i_q - g_{12}'i_d) \\ 0 & 0 & 1 & 0 \end{bmatrix} \begin{bmatrix} \hat{e}_d \\ \hat{e}_q \\ \hat{e}_\omega \\ \hat{e}_\theta \end{bmatrix} \quad (8)$$

Where;

$\hat{e}_d = \hat{i}_d - \check{i}_d, \hat{e}_q = \hat{i}_q - \check{i}_q$ $\hat{e}_\omega = \hat{\omega} - \omega, \hat{e}_\theta = \hat{\theta} - \theta$ Furthermore, $\dot{\hat{e}}_d$ stands for a differentiated value of $\hat{e}_d$. This also applies to $\dot{\hat{e}}_q$, $\dot{\hat{e}}_\omega$, and $\dot{\hat{e}}_\theta$.

Figure 2:
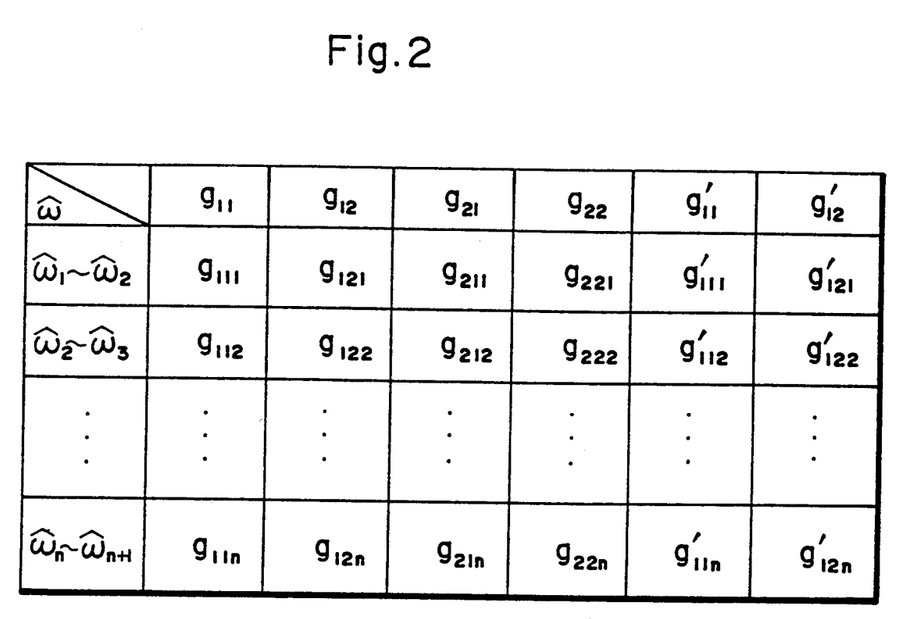
FIG. 2 is a schematic diagram showing a switch table adopted to switch a gain of an observer.

According to results from experiments, it has been confirmed that the observer gain need not be switched or changed over between the respective values for each speed, namely, the switch operation of the observer gain is t be conducted between predetermined appropriate speed ranges. In consequence, there is prepared a table, as shown in FIG. 2, containing values of the observer gain associated with the angular velocity $\hat{\omega}$ beforehand computed from the expression (8). The table is loaded in a memory of the observer gain switch unit 12. In this table, for the respective estimated angular velocity ranges $\omega_i$ to $\omega_{i+1}$ (i=1~n), gain values $g_{11i}$, $g_{12i}$, $g_{21i}$, $g_{22i}$, $g'_{11i}$ and $g'_{12i}$ are stored in association therewith. In operation, a value $\hat{\omega}_k$ estimated by the state estimation observer 11 at a point of time k is delivered to the observer gain switch unit 12, which acquires from the table an optimal gain associated with the value $\hat{\omega}_k$ to supply the obtained value as a gain $(G_{k+1})$ at a point of time$^{k+1}$ to the state estimation observer 11. Based on the optimal gain given by the observer gain switch unit 12, the observer 11 computes the estimation values $\hat{i}_{d,k+1}, \hat{i}_{q,k+1}$, $\hat{\omega}_{k+1}$ and $\hat{\theta}_{k+1}$ at the point of time k+1, thereby developing a predetermined control performance in the overall control speed range.

Figure 3:
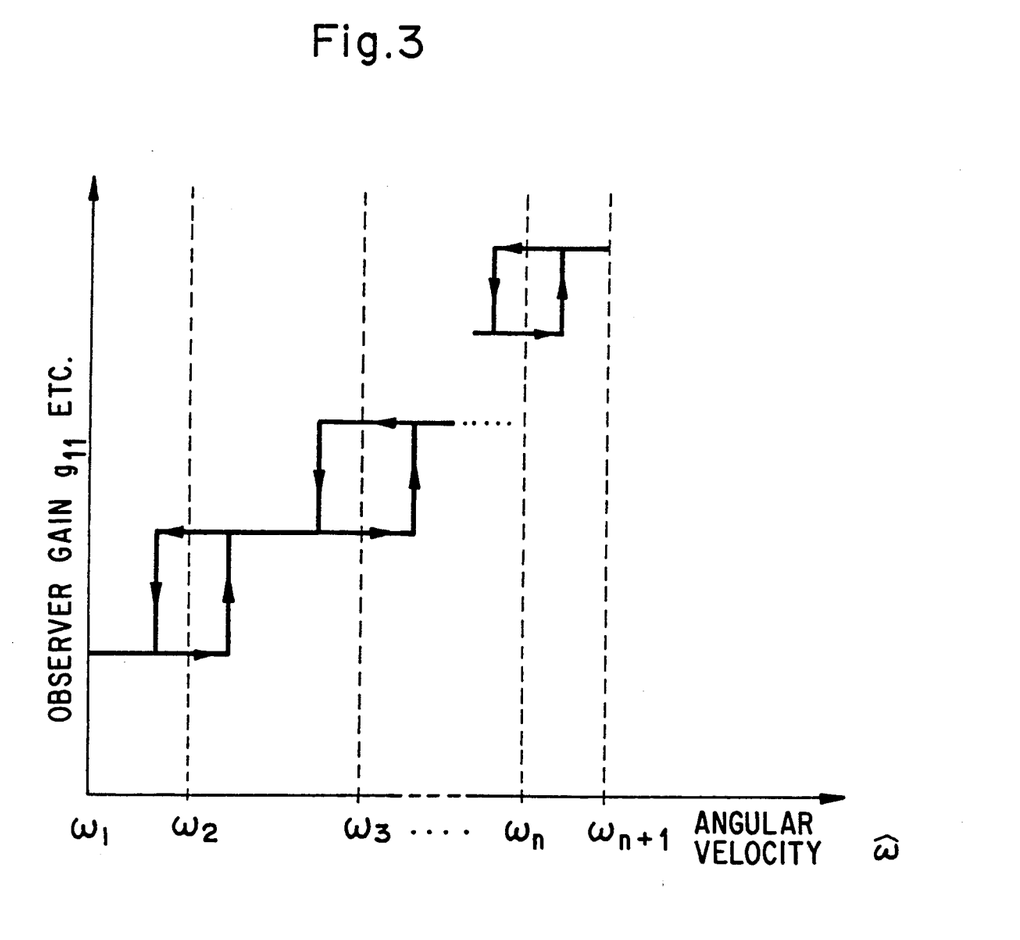
FIG. 3 is a graph showing a hysteresis of the gain of the observer.

At boundaries ($\omega_2$, $\omega_3$, etc.) of the speed for switching the observer gain, when the angular velocity rises and falls, the observer gain is frequently changed over. This causes the state estimation observer 11 to carry out an unstable operation and hence exerts a disadvantageous influence on the motor control characteristic. To cope with the problems above, the observer gain is supplied with a hysteresis with respect to the angular velocity as shown in FIG. 3, thereby removing the problems above. In this situation, the observer gain switch unit 12 need only conduct a decision processing to determine whether or not the received angular velocity $\hat{\omega}_k$ is within the hysteresis width. When the angular velocity is within the range, it need only be achieved to produce a gain with a value identical to the value of the previous output.

Figure 4:
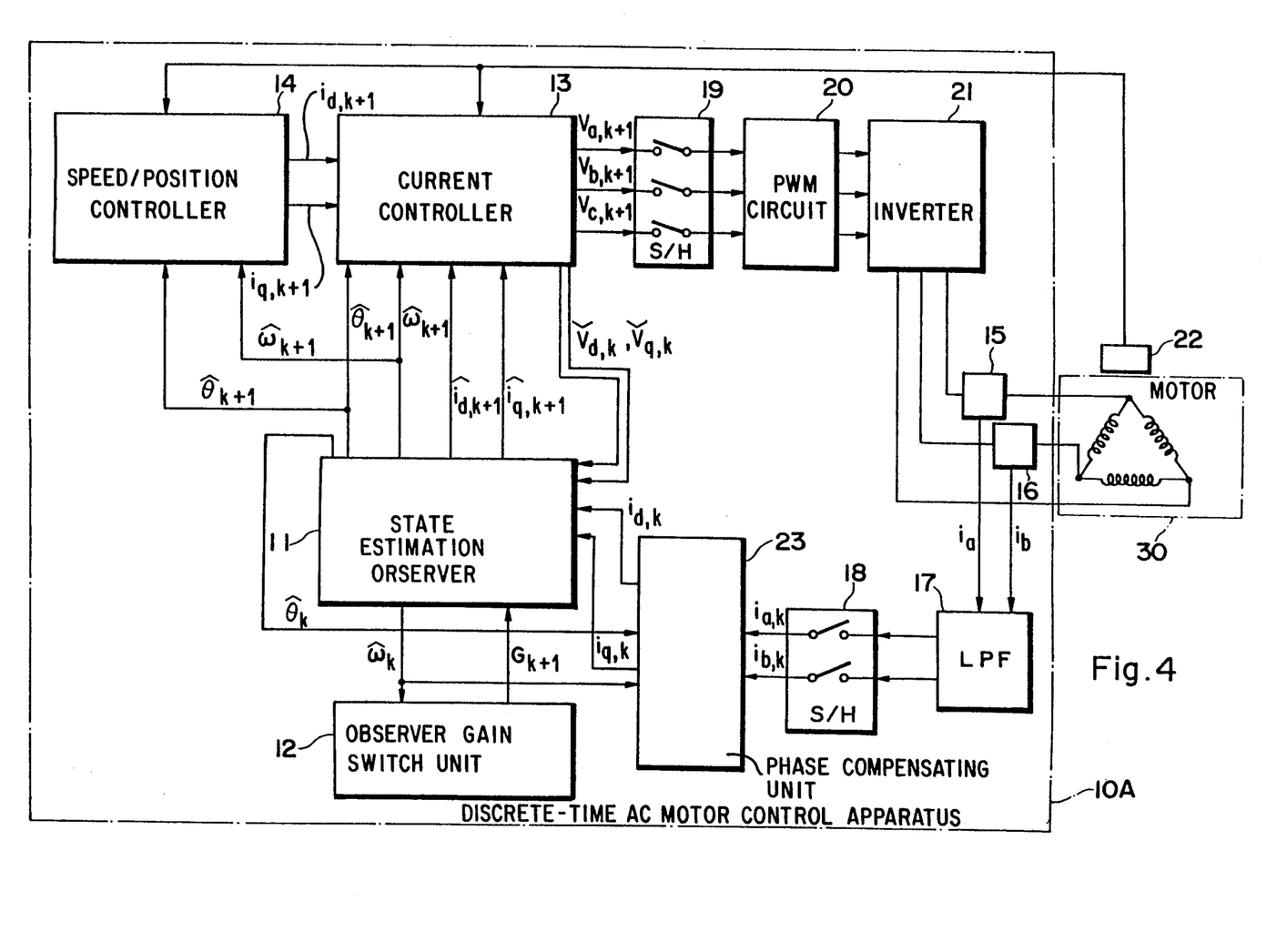
FIG. 4 is a functional block diagram showing a conceptual structure of a discrete-time alternating-current motor control apparatus.
Figure 5:
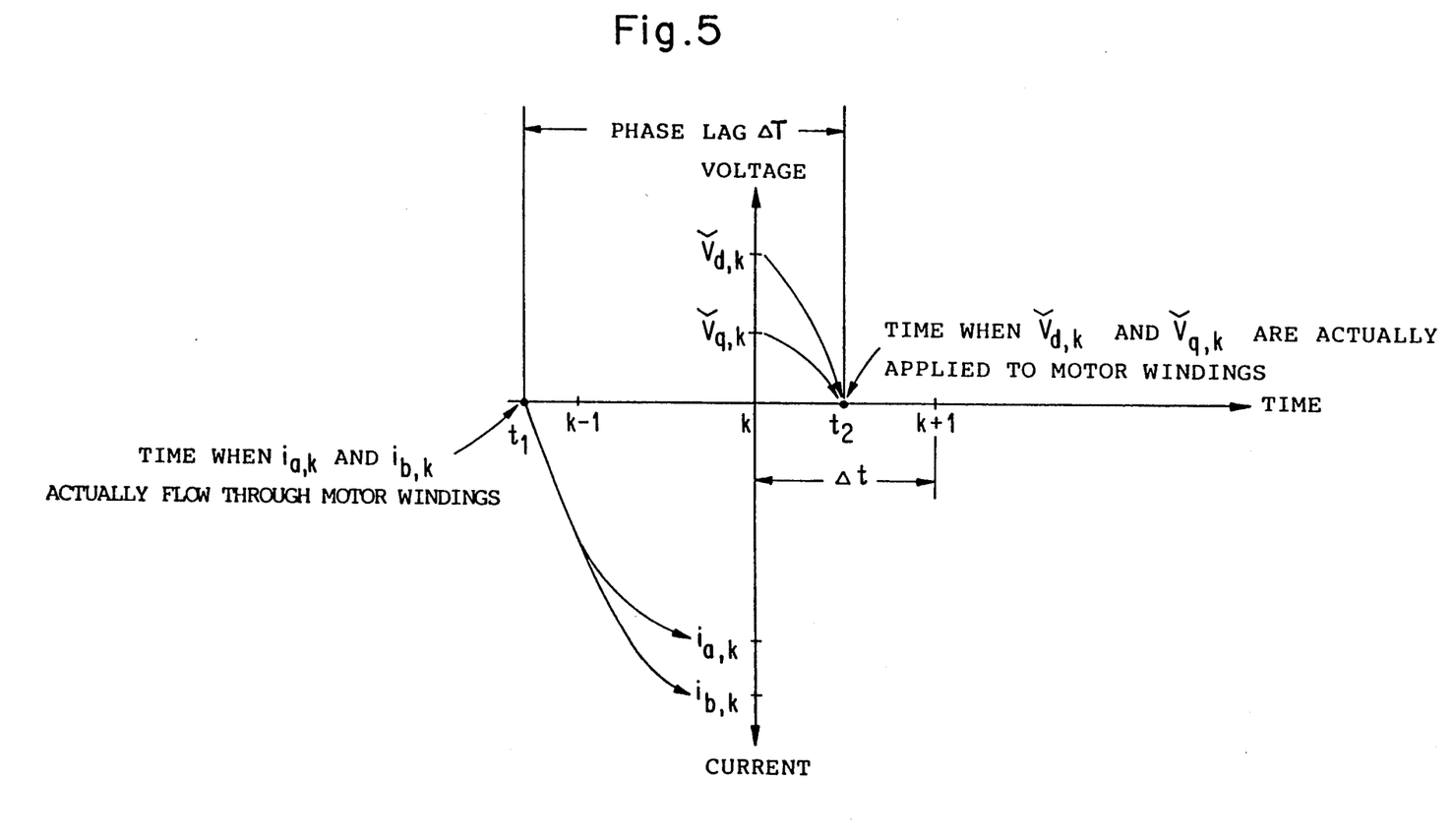
FIG. 5 is a graph illustratively showing relationships of phase differences between winding currents and voltages in the motor.
Figure 6:
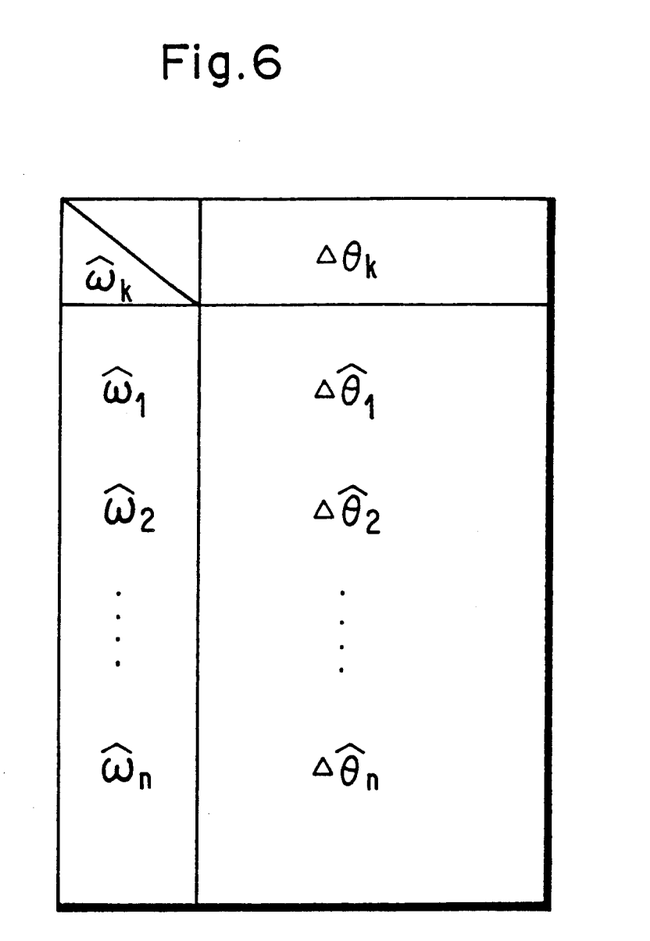
FIG. 6 is a diagram schematically showing a table containing phase correction angles.

Referring next to FIGS. 4 to 6, a description will be given of the discrete-time alternating-current motor control apparatus including a phase compensating unit.

In the motor control apparatus 10 of FIG. 1, the values $\check{v}_{d,k}$ and $\check{v}_{q,k}$ supplied to the state estimation observe 11 are resultant values of the direct quadrature transformation produced at the point of time k from the current controller 13 which outputs the value via the sample-and-hold circuit 19. Actually, the motor windings of the alternating-current motor 30 ar supplied with these voltages through the pulse width modulation circuit 20 and the inverter 21. Due to delays associated with these circuits, precisely, the values $\check{v}_{d,k}$ and $\check{v}_{q,k}$ are different from the voltages applied to the motor windings at the point of time k. Namely, the values $\check{v}_{d,k}$ and $\check{v}_{q,k}$ are applied to the motor windings at a point of time $t_2$ succeeding the point of time k as shown in FIG. 5.

On the other hand, the state estimation observer 11 is supplied with the currents $i_{a,k}$ and $i_{b,k}$, which are motor winding currents undergone the sampling at the point of time k. However, these currents are sent through the current sensors 15 and 16 and the low-pass filter 17 to the sample-and-hold circuit 18. Owing to the phase lags associated with these circuits, exactly, the currents $i_{1,k}$ and $i_{b,k}$ are different from the motor winding currents of the motor 30 at the point of time k. In actual operation, there are supplied the currents flowing in the motor windings at a point of time $t_1$ following the point of time k as shown in FIG. 5.

As above, the winding voltages $\check{v}_{d,k}$ and $\check{v}_{q,k}$ and the winding currents $i_{a,k}$ and $i_{b,k}$ are different from the respective actual values developed at the point of time k and hence a phase difference $\Delta T$ exists between the winding voltages and currents, which leads to the following problem. Since the state estimation observer 11 treats the winding currents and voltages as ones sensed at the same point of time, due to the phase difference $\Delta T$ therebetween, the estimated rotor angle, the angular velocity, and the winding currents include estimation errors.

In order to remove the problem above, a phase compensating unit 23 is disposed in a discrete-time alternating-current motor control apparatus 10A of FIG. 4. The phase compensator unit 23 may also be implemented by use of a computer provided with an appropriate program. In the constitution of FIG. 4, the same constituent components as those of FIG. 1 are assigned with the same reference numerals and a redundant description thereof will be avoided.

The phase compensating unit 23 is supplied with winding current $i_{a,k}$ and $i_{b,k}$ from the sample-and-hold circuit 18 and with the estimation values $\hat{\theta}_k$ and $\hat{\omega}_k$ estimated by the state estimation observer 11. The phase compensator unit 23 advances the phases of the received winding currents $i_{a,k}$ and $i_{q,k}$ by the phase difference $\Delta T$ and conducts a direct quadrature transformation on the obtained signals to resultantly supply the state estimation observer 11 with values $\check{i}_{d,k}$ and $\check{i}_{q,k}$ having a phase identical to the phase of the winding voltages $\check{v}_{d,k}$ and $\check{v}_{q,k}$. That is, since the state estimation observer 11 conducts the operation based on a direct-quadrature transformation model, by use of a value obtained by adding a correction angle $\hat{\Delta\theta}$ associated with the phase difference $\Delta T$ to the rotor angle $\hat{\theta}_k$ estimated by the state estimation observer 11, the coordinate transformation is accomplished according to the following expression (9) to equivalently equalize the phase between the voltage values $\check{v}_{d,k}$ and $\check{v}_{q,k}$ and the current values $\check{i}_{d,k}$ and $\check{i}_{q,k}$, respectively.

$$\begin{bmatrix} \check{i}_{d,k} \\ \check{i}_{q,k} \end{bmatrix} = \exp[-JN(\hat{\theta}_k + \Delta\hat{\theta}_k)]T(\hat{\theta}_k + \Delta\hat{\theta}_k)\begin{bmatrix} i_{a,k} \\ i_{b,k} \end{bmatrix} \quad (9)$$

Where, $T(\hat{\theta}_k + \Delta\hat{\theta}_k)$ is a matrix employed to transform the winding currents $i_{a,k}$ and $i_{b,k}$ in accordance with an orthogonal coordinate system of a two-phase stator.

The correction angle $\Delta\hat{\theta}_k$ to be added to the rotor angle $\hat{\theta}_k$ varies depending on the rotor angular velocity $\hat{\omega}_k$ and can be determined in advance. In consequence, it is favorable to store the correction values associated with the values of the rotor angular velocity $\hat{\omega}_k$ in a form of a table as shown in FIG. 6. Namely, from this table, the phase compensating unit 23 obtains a correction angle $\Delta\hat{\theta}_k$ associated with the rotor angular velocity $\hat{\omega}_k$ supplied from the state estimation observer 11, thereby conducting the computation based on the expression (9). Fixed values $\Delta\hat{\theta}_k$ may be naturally determined for the respective appropriate ranges of the rotor angular velocity $\hat{\omega}_k$.

Figure 7:
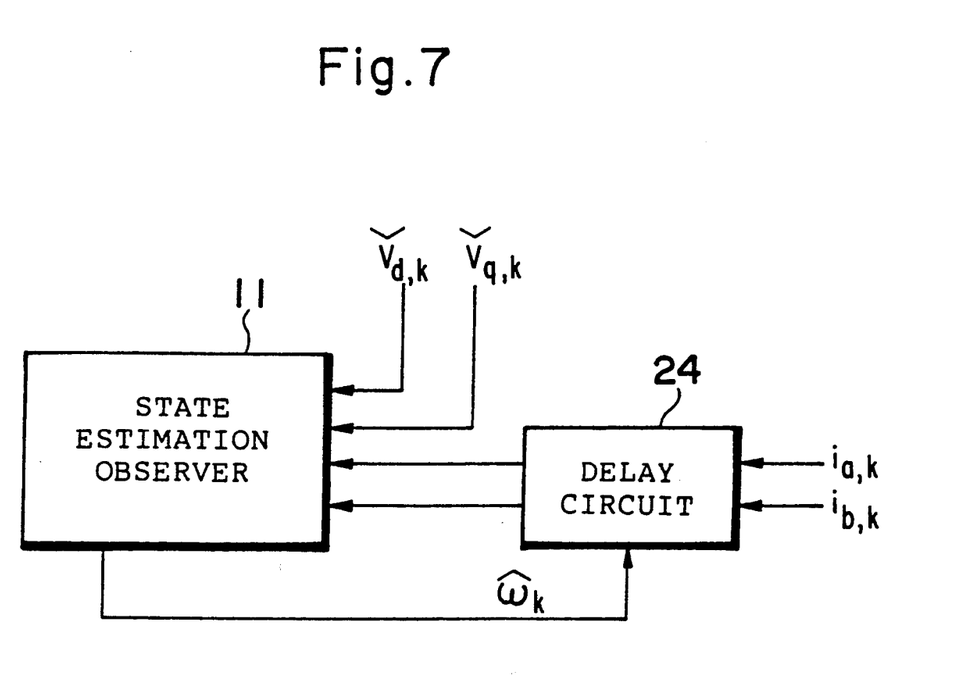
FIGS. 7 and 8 are block diagrams showing further alternative examples of phase compensate means to compensate phase differences of the winding currents and voltages.
Figure 8:
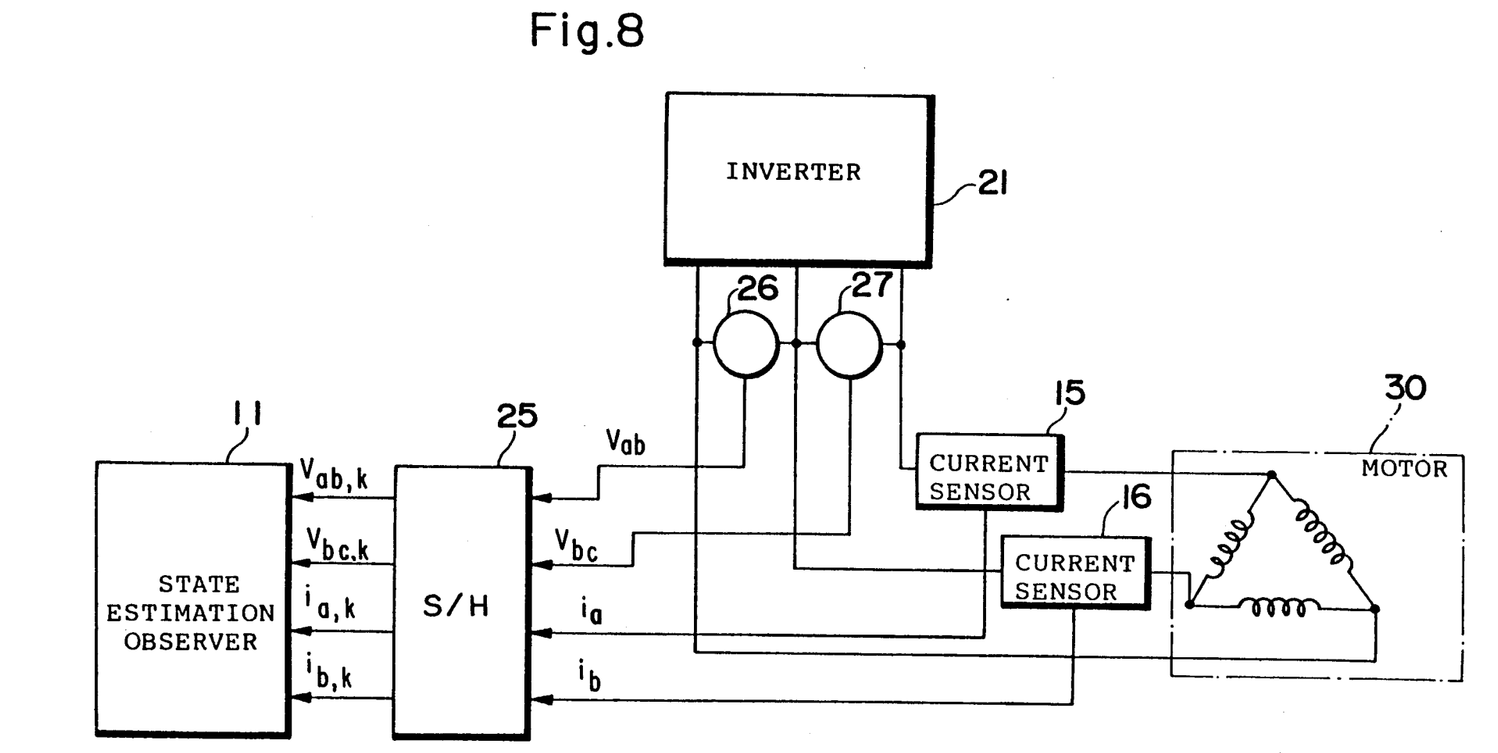

FIGS. 7 and 8 are schematic diagrams showing alternative embodiments according to the present invention.

In the constitution of FIG. 7, in order for the state estimation observer 11 to acquire the winding currents $i_{a,k}$ and $i_{b,k}$ at a point of time when the voltages $\check{v}_{d,k}$ and $\check{v}_{q,k}$ are actually applied to the windings, a delay circuit 24 is disposed to delay the current $i_{a,k}$ and $i_{b,k}$. The delay time of the delay circuit 24 is controlled depending on the angular velocity $\hat{\omega}_k$ estimated by the state estimation observer 11.

The configuration of FIG. 8 includes voltage sensors 26 and 27 respectively measuring voltages $v_{ab}$ and $v_{bc}$ actually applied to the windings of an alternating-current motor 30. Current values $i_a$ and $i_b$ respectively sensed by the current sensors 15 and 16 and voltages $v_{ab}$ and $v_{bc}$ respectively obtained by the voltage sensors 26 and 27 are supplied to the sample-and-hold circuit 25 to be sampled at an identical point of time. The sampled values are delivered as sensed values $i_{a,k}$, $i_{b,k}$, $v_{ab,k}$ and $v_{bc,k}$ at the point of time k to the state estimation observer 11. The sensed voltages $v_{ab,k}$, $v_{bc,k}$ are transformed into $v_{d,k}$ and $v_{q,k}$ in the state estimation observer 11.

While particular embodiments of the invention have been shown and described, it will be obvious to those skilled in the art that various changes and modifications may be made without departing from the present invention in its broader aspects.

What is claimed is:

1. A discrete-time alternating-current motor control apparatus comprising:
   state estimation observer means for receiving as inputs thereto winding voltages and winding currents of an alternating-current motor and for estimating based on a model of the alternating-current motor a rotor angle and a rotor angular velocity of the alternating-current motor; and
   observer gain switch means for setting an optimal gain to said state estimation observer means according to the estimated angular velocity.

2. A motor control apparatus in accordance with claim 1 wherein said observer gain switch means assigns a hysteresis with respect to an estimated angular velocity for a gain switch operation.

3. A motor control apparatus in accordance with claim 1 further comprising:
   origin angle sense means for sensing an origin position of a rotor of the alternating-current motor; and
   a controller for controlling the alternating-current motor based on an estimation result from said state estimation observer means and an origin position sensed by said origin angle sense means.

4. A discrete-time alternating-current motor control apparatus comprising:
   state estimation observer means for receiving as inputs thereto winding voltages applied to an alternating-current motor and winding currents sensed by a current sensor and for estimating based on a model of the alternating-current motor a rotor angle and a rotor angular velocity of the alternating-current motor; and
   means for compensating based on the estimated angular velocity a phase difference between the winding voltages and the winding currents.

* * * * *